Jan. 21, 1969     J. E. MOE     3,423,635

RAILROAD TRACK OR LINE CIRCUIT SURGE PROTECTORS

Filed July 25, 1966

INVENTOR.
James E. Moe
BY Robert H. Ware
ATTORNEY

United States Patent Office 3,423,635
Patented Jan. 21, 1969

3,423,635
RAILROAD TRACK OR LINE CIRCUIT SURGE PROTECTORS
James E. Moe, Ridgewood, N.J., assignor to Railroad Accessories Corporation, Cresskill, N.J.
Filed July 25, 1966, Ser. No. 572,638
U.S. Cl. 317—16
Int. Cl. H02h 9/06
1 Claim

ABSTRACT OF THE DISCLOSURE

A railroad communication system having a specific configuration in which a circuit extends along a railroad right of way, a pair of communication lines is connected to the circuit, a lightning arrestor is connected across the communication lines to drop the major part of a voltage surge, and communications equipment is connected across the communication lines on the far side of the lightning arrestor from the railroad right of way circuit. Inductance in the communication lines between the lightning arrestor and the communications equipment spreads the current due to voltage surges over a greater time period, thus reducing the peak current. Additionally, a semiconductor surge protector is connected across the communication lines on the far side of the lightning arrestor and the inductance from the railroad right of way circuit.

---

This invention relates to railroad track or line circuit surge protectors. More particularly, it relates to such surge protectors for protecting delicate electronic equipment, particularly that employing semi-conductors, from over-voltages in the range of a few volts to several hundred volts.

Railroad track and line circuits are subject to voltage surges from various causes. The most serious is lightning, either through direct hits or through induced currents in the circuits. These surges have hithertofore been reduced through the use of lightning arrestors, usually air-gap devices. These reduce the surges to a few hundred volts, and to pulses having a duration of no more than a few milliseconds. The vacuum tubes, relays and other electronic components hithertofore used in railroad track and signal circuits are capable of sustaining such surges without damage.

However, it has become highly desirable to employ semi-conductors in railroad, track and line apparatus as such semi-conductor devices provide the advantages of low power utilization, low heat dissipation, compactness and increased reliability. However, such semi-conductor devices are notoriously subject to damage and even catastrophic failure when subjected to voltage surges of the order of a few hundred volts for even microseconds.

It is therefore an object of the present invention to provide a railroad track or line circuit surge protector.

Another object of the invention is to provide a railroad track or line circuit surge protector for protecting semi-conductor circuit devices.

A further object of the invention is to provide a surge protector of the above character for protecting against voltages surges in the range of a few to several hundred volts.

A still further object of the invention is to provide a surge protector of the above character that dissipates little or no energy therein.

Another object of the invention is to provide a surge protector of the above character that is fail safe.

Still another object of the invention is to provide a surge protector of the above character employing solid state devices.

A further object of the invention is to provide a surge protector of the above character that is compact, reliable and inexpensive.

Other objects of the invention will in part be obvious and will in part appear hereinafter.

The invention accordingly comprises the features of construction, combinations of elements, and arrangements of parts which will be exemplified in the constructions hereinafter set forth. The scope of the invention will be indicated in the claim.

For a fuller understanding of the nature and objects of the invention, reference should be had to the following detailed description taken in connection with the accompanying drawing, in which.

The same reference characters refer to the same elements throughout the several views of the drawing.

Figure 1:
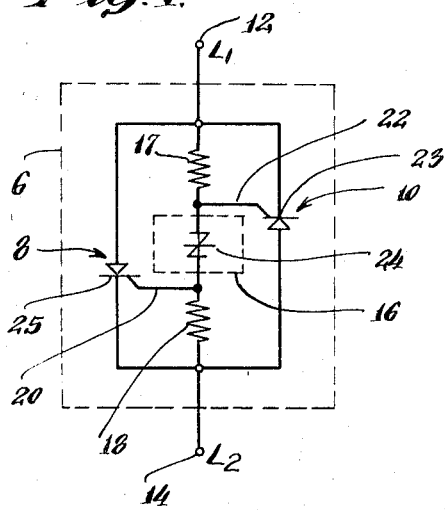
FIGURE 1 is a circuit diagram of a preferred railroad track or line circuit surge protector according to the present invention.

Now referring to FIGURE 1, the railroad track or line circuit surge protector 6 according to the present invention generally comprises a pair of controlled uni-directionally conductive devices 8 and 10 connected to conduct current in opposite directions between a pair of line terminals 12 and 14. A by-directionally conductive voltage sensitive breakdown means 16 is connected between line terminals 12 and 14 in series with a pair of resistive impedances 17 and 18. The triggers or control terminals 20 and 22 of the controlled uni-directionally conductive devices 8 and 10, respectively, are connected to opposite sides of the breakdown means 16.

As will be apparent to those skilled in the electronic art, until the potential applied between terminals 12 and 14 exceeds a predetermined value, no current will be conducted by the breakdown means 16, no current flows through resistors 17 and 18, and the triggers 20 and 22 of the controlled conducting devices 8 and 10 are at the same potential as the cathodes 23 and 25. The controlled conductive devices 8 and 10 will then be in their Off or open circuit condition.

When a predetermined potential, the breakdown voltage, is exceeded across the breakdown means 16, it will conduct. Assuming that the flow of current is from terminal 12 to terminal 14, the abrupt increase in potential at trigger 20 with respect to cathode 25 will cause controlled conducting device 8 to be switched to its On or conductive condition providing a short circuit between terminals 12 and 14. At the termination of the fault current when the voltage between terminals 12 and 14 is zero, device 8 will resume its non-conductive state and the surge protector 6 will be ready for the next surge.

More particularly and still referring to FIGURE 1, the surge protector 6, when designed to protect against surges greater than 30 volts potential between terminals 12 and 14 comprises silicon controlled rectifiers 8 and 10, for example General Electric's No. C31F rated at 50 volts peak reverse voltage. Resistors 16 and 18 are then chosen to be 1 kilohm, ½ watt resistors. The breakdown means 16 preferably is a four layer breakdown diode 24, for example, Texas Instrument's catalog No. 43.

Figure 2:
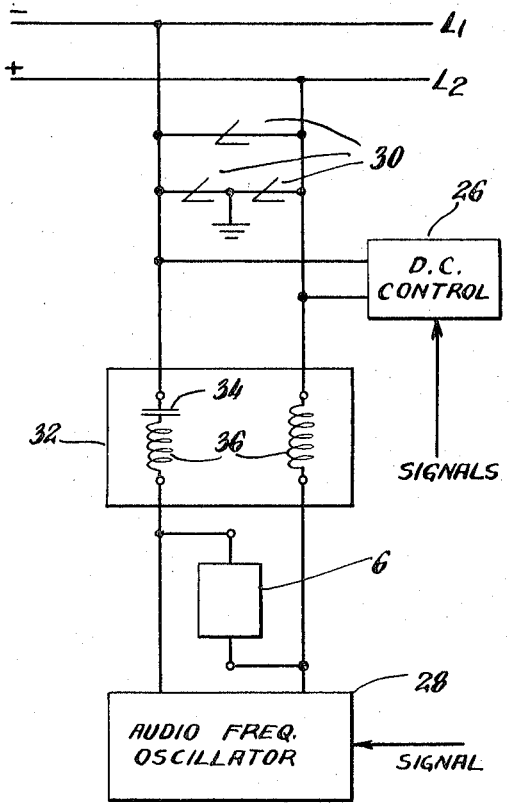
FIGURE 2 is a circuit diagram of a direct current carrying track or line circuit employing the surge protector of FIGURE 1.

Now referring to FIGURE 2, a track or line circuit comprising lines or tracks L1 and L2 has impressed thereon a direct current signal, of the polarity shown, by means of the DC control unit 26. Furthermore, it has an audio frequency signal imposed thereon via communication lines 27 and 29 by the audio frequency oscillator unit 28. The circuit is protected in the usual way by the three lightning arrestors 30, such as those of the air gap breakdown type manufactured by applicant's assignee, Railroad Accessories Corp. In the case of a track circuit applicant's assignee's Equalizers are employed, and in the case of a line circuit applicant's assignee's Clearview units are employed.

The surge protector 6 of the present invention is connected between lines L1 and L2. The surge protector 6 is isolated from the direct current applied to the track or line circuit by means of unit 32. This comprises a capacitor 34 providing direct current isolation. Unit 32 also provides a pair of inductors 36 for limiting and dissipating the energy of any fault current carried by the surge protector 6.

Figure 3:
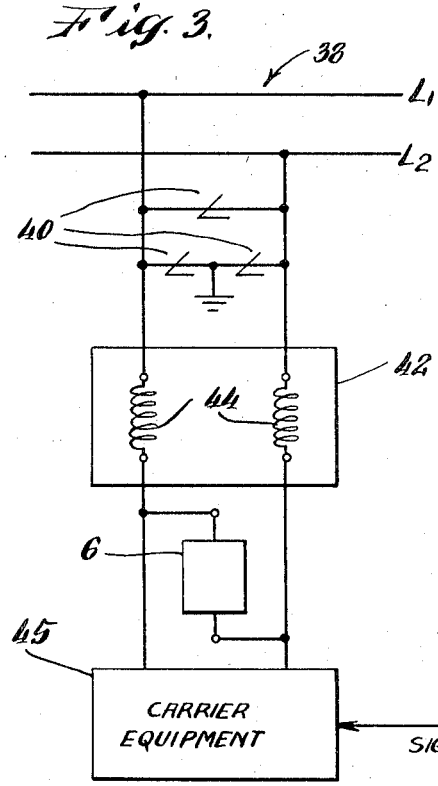
FIGURE 3 is a circuit diagram of a code or communication line circuit utilizing alternating current or pulsed direct current, only, and employing the surge protector of FIGURE 1.

Now referring to FIGURE 3, protection of a code or communications line, generally indicated at 38, is provided by applicant's assignee's air gap lightning arrestors 40 sold under the trademarks Clearview and Clearcom. These are connected across lines L1 and L2 as shown. Unit 42 provides a pair of inductors 44 for limiting and dissipating the energy of the fault currents conducted by the surge protector 6, connected across the lines L1 and L2. In the case of a code or communications line a plurality of alternating current signals of different frequencies are applied to the lines L1 and L2 by means of carrier equipment 45.

Figure 4:
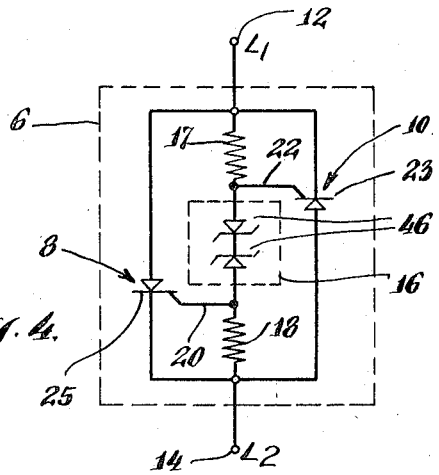
FIGURE 4 is a circuit diagram of alternative railroad track or line circuit surge protector according to the present invention.

While it is preferred that the breakdown device (breakdown means 16) be a four layer symmetrical breakdown diode 24, as shown in FIGURE 1, because of the extremely fast switching provided thereby to quickly trigger the silicon controlled rectifiers 8 and 10, in an alternative embodiment of the invention shown in FIGURE 4 a pair of Zener diodes 46 provide this function. The Zener diodes 46 are connected with their cathodes connected together as shown.

It will be apparent to those skilled in the art that some of the advantages of the surge protector of the present invention are that a different element carries the fault current than provides the voltage sensitivity for switching the fault current. This separation of functions allows the firing voltage to be precisely determined by the characteristics of the breakdown means 16 and does not vary over the life of the protector no matter how many fault currents are conducted thereby. Another advantage of the invention is the shunting of the fault current through essentially zero resistance in the surge protector 6. This means that the surge protector has to dissipate practically no energy. Thus, heating of the surge protector is not a problem. In typical applications, such as shown in FIGURES 2 and 3, during a lightning stroke the lightning arrestors will carry 50,000 amps and the surge protector will carry 3,000 to 4,000 amps. This current can easily be handled for the time involved in a large chip silicon controlled rectifier such as the GE C31F specified.

A further advantage of the invention is that the surge protector provides a fail safe system. That is, if due to failure of the conventional lightning arrestors, too large a fault current or a fault current for too long a time is conducted by the surge protector 6, the heating of the silicon controlled rectifiers 8 and 10 will cause their junctions to fuse together so as to establish a permanent short circuit across the terminals 12 and 14. Although this disrupts operation of the track or signal circuit (such a short is universally considered a "red" signal), further surges will still be faithfully conducted by the surge protector protecting the audio frequency or carrier equipment from these subsequent surges.

While I do not wish to be limited by any particular theory of the operation of my invention, I believe that the breakdown diode 24 is vastly superior to the Zener diodes 46 in my surge protector because the switching action of the breakdown diode occurs more or less simultaneously across the junction, whereas the switching action of the Zener diodes is provided by an avalanche breakdown which begins at one point across the junction and builds up relatively slowly. Thus, the breakdown diode 24 provides a larger signal earlier to the trigger 20 or 22 to more quickly switch on the appropriate silicon controlled rectifier.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

1. A system for communicating with locations distributed along a railroad truck, said system comprising:
   (A) a circuit extending along a railroad right of way;
   (B) a pair of communication lines each connected to respective sides of said circuit;
   (C) lightning arresting means connected across said communication lines to drop the major part of a voltage surge;
   (D) communications equipment connected across said communication lines on the far side of said lightning arresting means from said circuit, said communications equipment being liable to damage by voltage surges;
   (E) inductance in said communication lines between said lightning arresting means and said communications equipment for spreading the current due to voltage surges over a greater time period and thus reducing the peak current;
   (F) and a semiconductor surge protector connected across said communication lines on the far side of said lightning arresting means and said inductance from said circuit for dropping the remainder of said voltage surge, said surge protector comprising
      (1) a pair of controlled rectifiers having respective gate electrodes,
      (2) said rectifiers being connected to conduct in opposite directions between said communication lines, but normally being turned off,
      (3) a four-layer breakdown diode characterized by relatively rapid threshold breakdown in either direction connected between said comunication lines,
      (4) and impedance means in series with said breakdown diode to develop a signal voltage in response to said voltage surge,
      (5) said gate electrodes being connected to sense said signal voltage whereby to turn on the appropriately poled one of said rectifiers in response to said voltage surge.

References Cited

UNITED STATES PATENTS 3,102,226  8/1963  Borkovitz _____ 323—24 X
3,252,051  5/1966  Walker _____ 317—16 X
3,353,067  11/1967  White _____ 317—33

JOHN F. COUCH, Primary Examiner.

J. D. TRAMMELL, Assistant Examiner.

U.S. Cl. X.R.

317—31, 33, 50; 323—24